Patented Dec. 29, 1931

1,838,862

UNITED STATES PATENT OFFICE

CLAYTON OLIN NORTH, OF AKRON, OHIO, ASSIGNOR TO THE RUBBER SERVICE LABORATORIES CO., OF AKRON, OHIO, A CORPORATION OF OHIO

VULCANIZATION OF RUBBER

No Drawing.      Application filed April 13, 1926.  Serial No. 101,830.

The present invention relates to the vulcanization of natural or synthetic rubber, or similar materials, such as balata, gutta-percha, and the like, and is especially directed to the acceleration of the vulcanization process by employing for that purpose a new type of compound as is hereinafter fully set forth and described.

Tetra-hydro-quinaldine has been shown to possess the formula

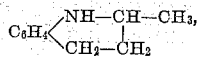

wherein an alkyl group attached to the alpha carbon atom is reactive. This group reacts with the oxygen atom of the carbonyl group of an aldehyde, for example with acetaldehyde, to produce a condensation product of the formula

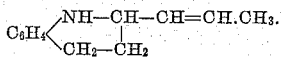

Other aliphatic aldehydes react in a similar manner. The tetra-hydro-quinaldine employed in the manufacture of the preferred product is produced by reduction of quinaldine by any suitable means, for example by the electrolytic reduction of a sulfuric acid solution thereof. The reduced product is then reacted in equi-molecular proportions in an aliphatic aldehyde to produce the product desired for use in a rubber mix.

The following is an example of one mode of carrying out the present invention. A mixture of 100 parts of the variety of rubber known to the trade as pale crepe rubber, 5 parts of zinc oxide, and 3.5 parts of sulphur, is preared on the rubber mixing mills in the well known manner, and 0.8 parts of an aldehyde derivative of tetra-hydro-quinaldine is incorporated homogeneously throughout the mix. The rubber compound so obtained is vulcanized by heating in a press at the temperature given by approximately forty pounds of steam pressure per square inch for a period of about forty-five minutes. The vulcanized product upon testing is found to possess a modulus at 300% elongation of 260, at 500% of elongation of 658, at 700% elongation of 2570, a tensile strength at break of 3645 pounds per square inch and an ultimate elongation of 760%. In the example as shown, it was found that an exceptionally high quality compound resulted after only fifteen minutes heating under the conditions specified. In other words, the class of accelerators disclosed herein possesses the property of quickly producing a high grade vulcanized product of commercial value which is not detrimentally affected or over-vulcanized by continuing the heat treatment. This is an important property in the case of certain types of rubber compounds.

A good commercial hard rubber was obtained by heating for approximately two hours at a temperature given by forty pounds of steam pressure per square inch, a mixture prepared in the usual manner and comprising 20 parts of amber crepe rubber, 20 parts of smoked sheet rubber, 5 parts of lime, 15 parts of zinc oxide, 10 parts of mineral rubber, 25 parts of sulphur and 2 parts of one of my new type of accelerators, for example, an acet-aldehyde derivative of tetra-hydro-quinaldine.

A rubber mixture intended for use as a tread compound may be manufactured by preparing a mix comprising 31 parts of smoked sheet rubber, 20 parts of amber crepe rubber, 20.5 parts of zinc oxide, 19 parts of carbon black, 3.5 parts of mineral rubber, 1 part of a blended mineral and vegetable oil, 2 parts of sulphur, and 0.75 parts of the acet-aldehyde derivative of tetra-hydro-quinaldine. The mixture is vulcanized by heating for approximately forty-five minutes in a press at the temperature given by forty pounds of steam pressure per square inch. Upon testing, the vulcanized product was found to possess a modulus at 300% elongation of 1035, at 500% elongation of 2995, a tensile strength at break of 3935 pounds per square inch and an ultimate elongation of 600%.

The same compound as shown in the last example hereinbefore given may be prepared with the use of one part of the acet-aldehyde derivatives of tetra-hydro-quinaldine in place of the quantity mentioned in the example. In this case, the mixture after heating in a press for thirty minutes under forty pounds of steam pressure per square inch produced a vulcanized product which possessed a tensile strength of 4250 pounds per square inch, an ultimate elongation of 640 and a modulus of elasticity of 500% elongation of slightly over 3000.

Other aldehyde derivatives of tetra-hydroquinaldine may likewise be employed for the manufacture of different types of rubber compounds intended for a wide variety of uses. Thus, for example, formaldehyde, propionaldehyde, butylaldehyde, heptaldehyde, crotonaldehyde, aldol and acrolein derivatives, as well as other derivatives, preferably the derivatives obtained by reacting aliphatic aldehydes containing a $CH_3$ grouping with tetra-hydro-quinaldine may be employed to advantage in the manufacture of vulcanized rubber products in the manner as set forth, as well as in the production of other rubber goods as are apparent to those skilled in the art of rubber compounding.

My invention is not to be considered as limited in scope by any examples given which are intended only as illustrative of and not limitative of the invention. Furthermore, it is to be understood that my present invention is not dependent upon the soundness or accuracy of any theory advanced by way of explaining my invention but is limited solely by the following claims which are hereby made a part of the specification.

What I claim is:

1. The process of producing vulcanized rubber which comprises heating a mixture of rubber and sulphur with an aliphatic aldehyde derivative having less than eight carbon atoms of an alpha alkyl substituted tetra-hydro-quinoline.

2. The process of producing vulcanized rubber which comprises heating a mixture of rubber and sulphur with an aliphatic aldehyde derivative having less than eight carbon atoms of an alpha methyl substituted tetra-hydro-quinoline.

3. The process of producing vulcanized rubber which comprises heating a mixture of rubber and sulphur in the presence of a small proportion of the reaction product of tetra-hydro-quinaldine with an aliphatic aldehyde having less than eight carbon atoms.

4. The process of producing vulcanized rubber which comprises heating a mixture of rubber and sulphur in the presence of a small proportion of the reaction product of tetra-hydro-quinaldine with an aliphatic aldehyde having less than eight carbon atoms, and containing a $CH_3$ grouping.

5. The process of producing vulcanized rubber which comprises heating a mixture of rubber and sulphur in the presence of a small proportion of the reaction product of tetra-hydro-quinaldine with acetaldehyde.

6. The vulcanized rubber product obtained by heating rubber and a vulcanizing agent in the presence of an aliphatic aldehyde derivative having less than eight carbon atoms of an alpha alkyl substituted tetra-hydro-quinoline.

7. The vulcanized rubber product obtained by heating rubber and a vulcanizing agent in the presence of an aliphatic aldehyde derivative having less than eight carbon atoms of an alpha methyl substituted tetra-hydro-quinoline.

8. The vulcanized rubber product obtained by heating rubber and a vulcanizing agent in the presence of the reaction product of tetra-hydro-quinaldine with an aliphatic aldehyde having less than eight carbon atoms.

9. The vulcanized rubber product obtained by heating rubber and a vulcanizing agent in the presence of the reaction product of tetra-hydro-quinaldine with an aliphatic aldehyde having less than eight carbon atoms containing a methyl group.

10. The vulcanized rubber product obtained by heating rubber and a vulcanizing agent in the presence of the reaction product of tetra-hydro-quinaldine with acetaldehyde.

Signed at Akron, in the county of Summit, and State of Ohio, this 8th day of April, A. D. 1926.

CLAYTON OLIN NORTH.